United States Patent [19]
Carter et al.

[11] Patent Number: 5,295,726
[45] Date of Patent: Mar. 22, 1994

[54] SIDEKIT PANEL FOR TRUCK OR TRAILER

[75] Inventors: Alan T. Carter, Sturgis; Kirk A. Myers, Union, both of Mich.

[73] Assignee: Carter Associates, Inc., Sturgis, Mich.

[21] Appl. No.: 65,349

[22] Filed: May 21, 1993

Related U.S. Application Data

[63] Continuation-in-part of Ser. No. 919,547, Jul. 24, 1992, abandoned.

[51] Int. Cl.⁵ .............................................. B62D 33/023
[52] U.S. Cl. ...................................... 296/191; 296/36; 52/578
[58] Field of Search .............. 296/191, 32, 36, 43; 52/582, 578, 584, 579

[56] References Cited

U.S. PATENT DOCUMENTS

| | | | |
|---|---|---|---|
| 2,585,976 | 2/1952 | Teeter | 296/191 X |
| 3,712,005 | 1/1973 | Eschbach et al. | 296/191 X |
| 4,007,567 | 2/1977 | Mooney et al. | 296/191 X |
| 4,567,698 | 2/1986 | Morrison | 52/578 X |
| 5,042,395 | 8/1991 | Wackerle et al. | 296/191 X |
| 5,140,913 | 8/1992 | Takeichi et al. | 296/191 X |

FOREIGN PATENT DOCUMENTS 2241516 9/1991 United Kingdom ................. 296/191

Primary Examiner—Joseph D. Pape
Attorney, Agent, or Firm—Flynn, Thiel, Boutell & Tanis

[57] ABSTRACT

A sidewall panel for securement between posts associated with a truck bed. The panel is defined by a generally rectangular ringlike frame having generally parallel top and bottom edge rails which are rigidly joined together by vertically extending edge rails. Corner members couple the horizontal and vertical edge rails together. The interior of the frame is occupied by a sheet of stiffening material, such as a rigid plastic foam sheet. Opposite sides of the panel are defined by thin covering sheets of hard material, such as rigid plastic.

21 Claims, 5 Drawing Sheets

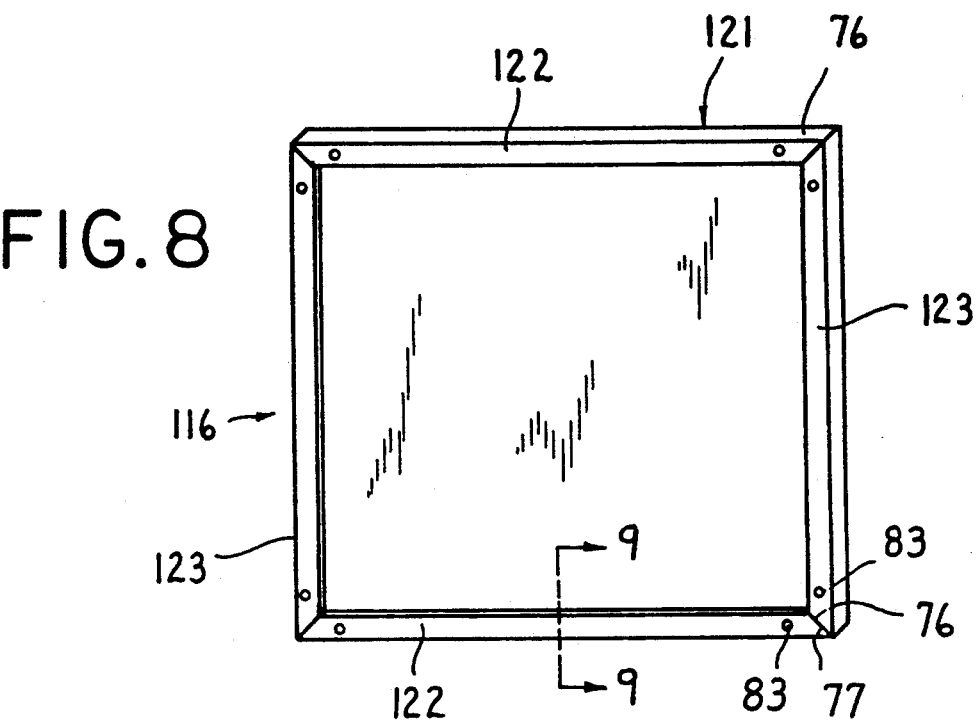
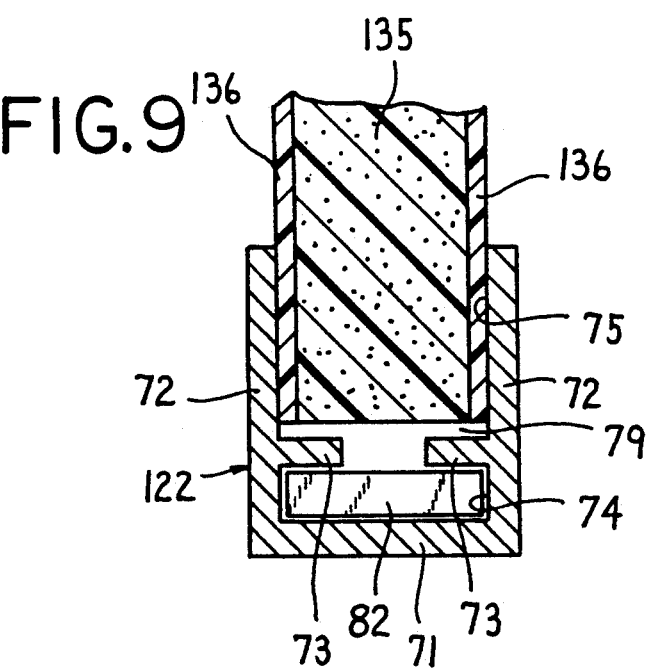

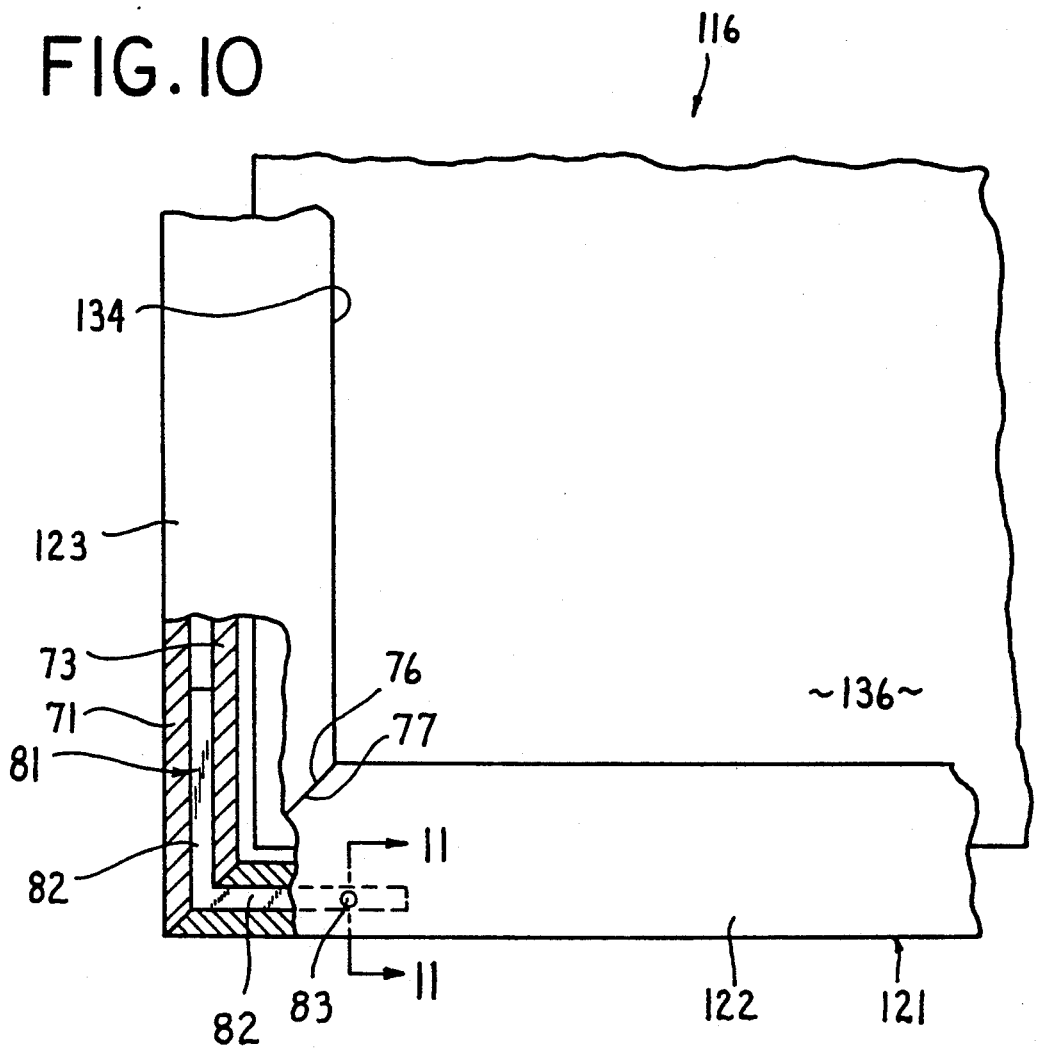
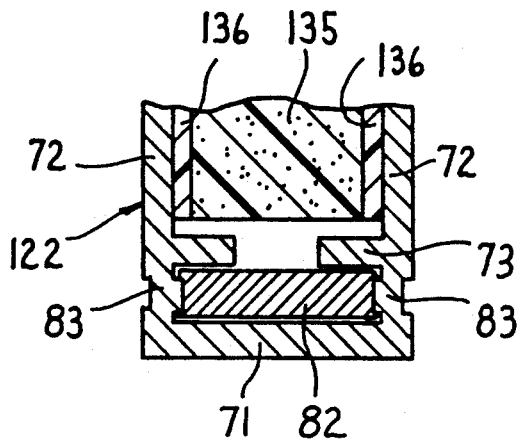

ance, and is capable of withstanding weather and use abuse.

The present invention, in one embodiment thereof, can be readily cut to reduce the width thereof and reassembled so as to accommodate the particular width between an adjacent pair of posts, which cutting and reassembly operation can be accomplished without requiring complex tools or extensive expenditure of time.

In a preferred embodiment of the invention, the sidewall panel is defined by a generally rectangular ringlike frame having generally parallel top and bottom edge rails which are rigidly joined together by vertically extending edge rails, with the corner connection between each pair of rails including a corner member which couples to the respective horizontal and vertical edge rails. The interior of the frame is occupied by a sheet of stiffening material, such as a rigid plastic foam sheet. Thin covering sheets of hard material, such as rigid plastic, extend over opposite sides of the center stiffening sheet.

In the sidewall panel according to one embodiment of the present invention, the corner member includes a main blocklike part which defines the actual corner of the panel and abuts the end of one of the adjacent two rails which join at the corner. The corner member also has a pair of cantilevered support legs which project outwardly in perpendicular relationship from the blocklike part. Each of the cantilevered support legs projects longitudinally into and snugly engages the end of the respective edge rail, the latter preferably being of channel-like cross section to snugly receive the support leg therein.

With the improved sidewall panel of said one embodiment, as aforesaid, the panel can be suitably cut to remove a width segment of desired magnitude, and then reassembled to provide a panel of desired reduced width. For example, a first cut can be provided vertically generally parallel with and closely adjacent one side rail so as to permit separation of the one side rail and respective corner members from the panel. A second cut can be made vertically across the panel at a distance from the first cut corresponding to the width of panel section which is to be removed. This can be accomplished using rather simple tools such as a hacksaw and a utility knife. Thereafter the removed vertical edge rail and corner members are reattached to the remainder of the panel, such as by inserting the corner member legs into the cut ends of the top and bottom edge rails, and preferably using an adhesive for securement along the cut edges.

In the sidewall panel according to a further embodiment of the present invention, the corner member is of L-shaped configuration and has a pair of cantilevered support legs which project outwardly in perpendicular relationship from one another. Each of the cantilevered support legs projects longitudinally into and engages the end of the respective edge rail for fixed securement therewith, which edge rail is preferably of channel-like cross section to snugly receive the support leg therein. The L-shaped corner member is disposed wholly interiorly of the rails which meet and define a corner of the frame.

Other objects and purposes of the invention will be apparent to persons familiar with structures of this general type upon reading the following specification and inspecting the accompanying drawings.

SIDEKIT PANEL FOR TRUCK OR TRAILER

CROSS REFERENCE TO RELATED APPLICATION

This application is a continuation in part of copending application Ser. No. 07/919,547 filed on Jul. 24, 1992, now abandoned.

FIELD OF THE INVENTION

This invention relates to a removable sidewall structure as used in conjunction with the bed of a truck or trailer and, more specifically, to an improved sidewall panel for use in such sidewall structure.

BACKGROUND OF THE INVENTION

Many trucks and trailers are of the flat bed type in that they are not provided with any permanent sidewall structure to provide optimum flexibility with respect to the size and shape of goods which are to be transported on the bed. In many instances, however, a temporary and removable sidewall structure can be secured to the bed around the periphery thereof so as to define a generally open top container, which top is typically covered with a canvas. The removable sidewall structure typically employs a plurality of upright posts or stakes which are removably secured to the bed at horizontally spaced intervals around the periphery thereof. The stakes typically engage within sockets or receiving structures provided on the bed along the peripheral edge thereof. These stakes or posts, which are typically about 4 foot high, often have a pair of channels formed along opposite sides thereof, whereby a sidewall panel, typically a 2'×4', or a 4'×4' panel, can be disposed between each adjacent pair of posts with the panel edges being confined within the channels. These channels enable the sidewall panels to be vertically slidably inserted into or removed from between adjacent pairs of posts.

In a typical construction, the sidewall panels are constructed of plywood so as to be of simple and economical construction. This construction was also believed necessary to permit the panels to be easily cut or reduced in width without requiring complex tools or equipment so that the panels could be made to fit nonstandard spacing between adjacent posts.

While sidewall panels of typical construction, particularly plywood panels, have been and still are extensively utilized, nevertheless such panels have proven to possess significant disadvantages. For example, such panels readily deteriorate due to abuses encountered during use. Weather conditions and particularly moisture also cause the panels to deteriorate in a rather short period of time. Such panels are also difficult to maintain and hence have a very undesirable appearance within a very short period of time, and thus have a very short useful life. Replacement of such panels is required with undesirable frequency.

Accordingly, it is an object of this invention to provide an improved sidewall panel which is believed to overcome many of the advantages associated with conventional panels as described above.

More specifically, the present invention relates to an improved sidewall panel for use in conjunction with the removable sidewall structure of a truck or trailer bed, which improved sidewall panel is of economical construction, possesses significant durability so as to permit relatively long-term use, maintains a desirable appear-

BRIEF DESCRIPTION OF THE DRAWINGS

FIG. 8 is a perspective view of an improved side panel according to a further embodiment of the present invention.

FIG. 9 is an enlarged, fragmentary sectional view taken along line 9—9 in FIG. 10.

FIG. 10 is an enlarged, fragmentary view, partially in section, illustrating the construction of the side panel of FIG. 8.

FIG. 11 is an enlarged, fragmentary sectional view taken along line 11—11 in FIG. 10.

Figure 1:
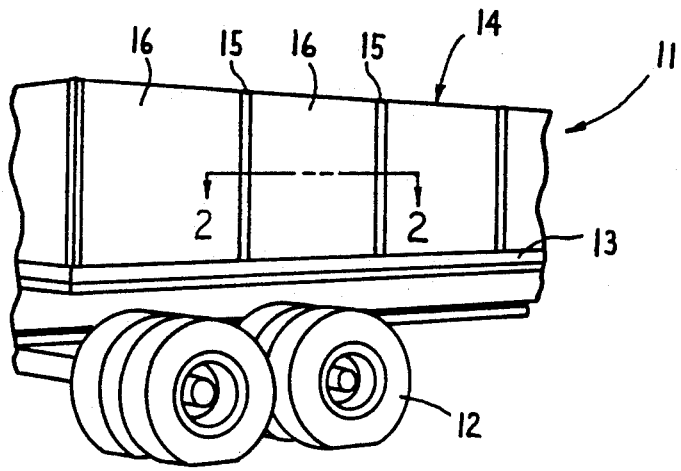
FIG. 1 is a fragmentary perspective view illustrating part of a conventional truck or trailer bed having a sidewall or skirting structure associated therewith.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the panel and designated parts thereof. Said terminology will include the words specifically mentioned, derivatives thereof, and words of similar import.

DETAILED DESCRIPTION

Figure 2:
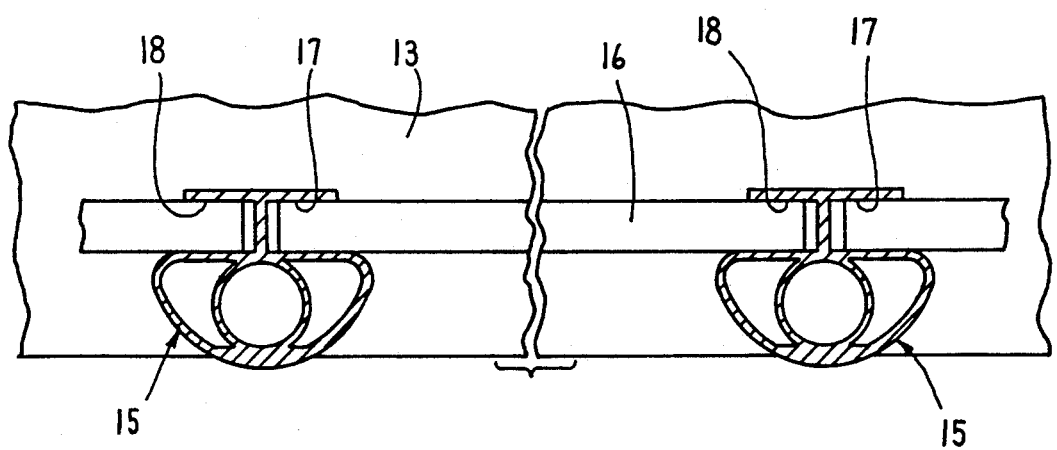
FIG. 2 is a sectional view of a conventional skirting arrangement taken substantially along line 2—2 in FIG. 1.

Referring to FIGS. 1 and 2, there is illustrated part of a conventional truck or trailer 11 having ground-engaging wheels 12 associated therewith, which truck or trailer includes a generally conventional horizontally enlarged flat bed 13 adapted for carrying loads. A sidewall structure 14 extends along the perimeter of the bed 13 and projects upwardly for defining an enclosure around the bed, which sidewall structure 14 is often open at the upper end so that the top of the load area is conventionally covered by a removable canvas. The sidewall structure 14 is conventionally formed by upright posts or stakes 15 which have the lower ends thereof seated within suitable openings or sockets which are defined in the bed either adjacent or at the perimeter thereof. These posts 15 are generally spaced apart at selected intervals along the perimeter of the bed, and appropriate sheetlike side panels 16 cooperate between adjacent posts and project upwardly from the bed to define a side enclosure for the bed. The side panel 16 typically has opposite vertical end edges thereof slidably received within vertically elongate slots 17 and 18 which are defined on and open outwardly from opposite sides of each post 15. The panel 16 conventionally has a square or rectangular profile when viewed vertically from the side, a height substantially corresponding to the projecting height of the posts 15, and a length substantially corresponding to the horizontal spacing between the bottoms of facing slots 17, 18 as defined in adjacent posts. The panels 16, in many typical sidewall structures, have length and height dimensions which typically are about 4'×4'.

Reference will now be made to FIGS. 4–7 which illustrate the improved side panel 16 according to a first embodiment of the present invention. The side panel 16 according to this first embodiment includes a generally rectangular ringlike frame 21, which resembles a picture frame, defined by generally parallel top and bottom rails 22 rigidly joined together by generally parallel side rails 23, with the rails 22 and 23 generally being elongated so as to project approximately horizontally and vertically, respectively. The frame 21 also includes a set of four corner clips or members 24, one of which is associated with each corner of the side panel for rigidly joining adjacent ends of one horizontal frame rail 22 to one vertical side rail 23.

Figure 5:
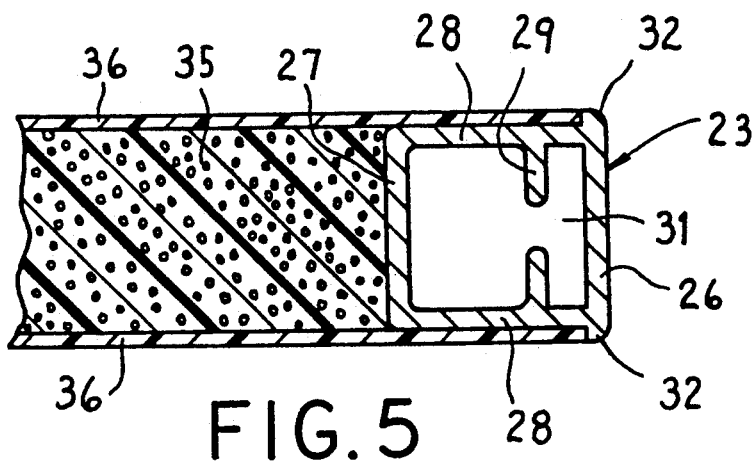
FIG. 5 is a fragmentary section view taken substantially along line 5—5 in FIG. 4.

Each vertical side rail 23, as illustrated by FIG. 5, is of a generally hollow or tubular cross section having a main rectangular profile defined by generally parallel outer and inner walls 26 and 27, respectively, the latter being fixedly and permanently rigidly joined together by generally parallel sidewalls 28 which extend generally perpendicularly with respect to the outer and inner walls 26 and 27 to define a hollow tube of generally rectangular cross section.

The side rail 23 also has an interior wall or flange 29 which projects generally perpendicularly inwardly from each sidewall 28 in generally parallel relationship with and between the walls 26 and 27, whereby the flange 29 cooperates with the outer wall 26 to define an elongate guide channel or space 31 therebetween. This flange 29 in the illustrated embodiment includes sections which project inwardly from the opposite sidewalls 28 with the opposed sections being spaced by an intermediate gap, although the flange 29 could extend continuously across and between the sidewalls 28 if desired.

The outer wall 26 of side rail 23 also has edge parts 32 which are effectively coextensive and coplanar with the outer wall 26 and which project outwardly a small distance beyond the respective sidewalls 28 to define small ledges or shoulders which are disposed exteriorly of the rectangular tubular cross section and project longitudinally throughout the entire length of the rail.

The horizontal rails 22 are identical in cross section to the side rails 23, and all such rails are preferably formed by being extruded of aluminum.

Figure 4:
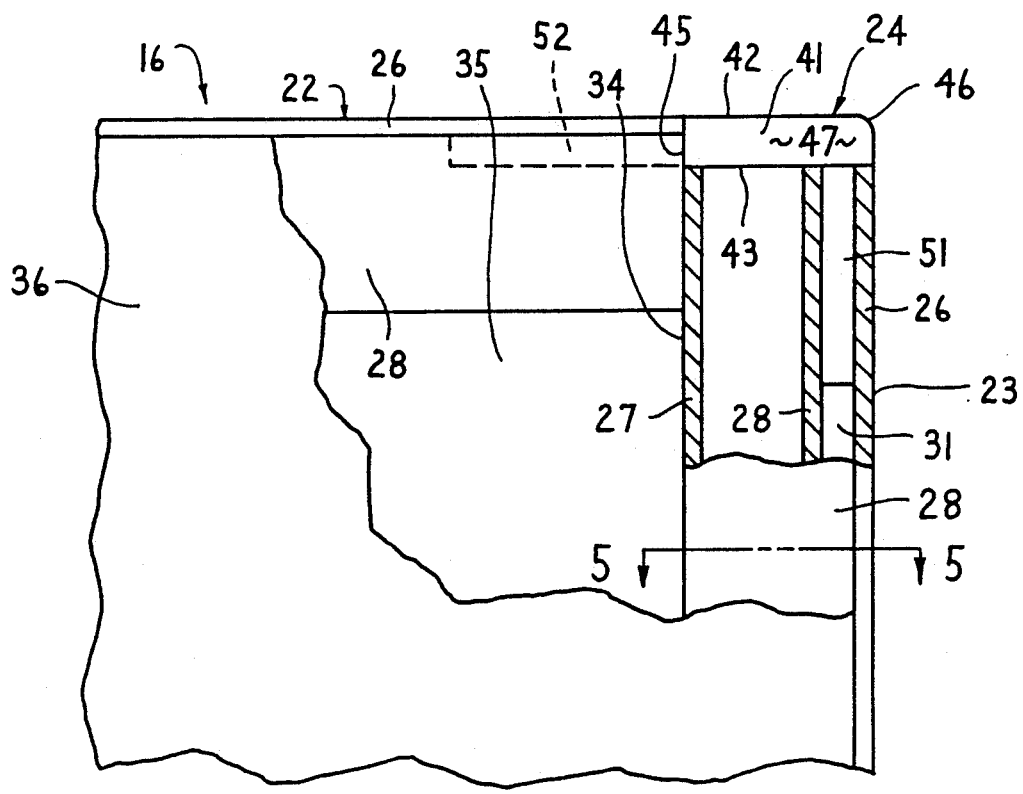
FIG. 4 is an enlarged, fragmentary view, partially in section, illustrating the construction of the side panel of said one embodiment.

The rectangular ringlike frame 21, as illustrated by FIG. 4, defines therein an opening 34 in which a core structure 35 is positioned so as to totally occupy the opening 34. This core structure 35 preferably comprises a sheetlike element having a thickness which substantially corresponds to the thickness or width of the frame rails as defined by the inner wall 27, with this sheetlike core member 35 preferably being constructed of a rigid foamed plastic. This core sheet 35 preferably has the edges thereof adhesively secured to the adjacent surfaces of the inner walls 27 associated with the frame rails. The frame and core structure in turn are preferably provided with side coverings 36 adhered to opposite sides thereof. These side coverings 36 preferably comprise thin sheetlike members, such as thin rigid plastic sheets or panels, which coextensively overlie the exterior side surfaces of the core sheet 35 and the surrounding rectangular frame 21, with edges of the side sheets 36 being disposed so as to substantially abut the edge parts 32 defined on the frame rails. These side coverings 36 are preferably adhesively secured to the side surfaces of the core sheet 35 and frame 21. Each side sheet 36 preferably has a thickness which substantially corresponds to the sideward projection of the edge part 32 so as to define a substantially flush abutting relationship with the edge part 32.

As illustrated by FIG. 4, the top rail 22 (and also the bottom rail 22) has the end thereof abutted against the inner surface of the inner wall 27 of the vertical side rail 23 s that the end portion of rail 23 vertically overlaps the horizontal rail 22, with opposite ends of the side rails 23 being disposed closely adjacent the respective upper and lower surfaces of the panel. The adjacent ends of the rails 22 and 23 are each rigidly joined by one of the corner members 24 as aforesaid, with an identical said corner member 24 being provided at each of the four corners of the panel.

The corner part 41 is constructed as an integral one-piece metal part and includes a six-sided blocklike corner part 41 which on one side thereof defines an enlarged outer wall 42, and the other side thereof defines an enlarged inner wall 43 which is disposed substantially parallel with the outer wall 42. A small edge wall 44 extends generally perpendicularly between the walls 42-43, and an inner edge wall 45 which extends generally parallel with the edge wall 44 extends generally perpendicularly inwardly from the other side of the large edge wall 42. A rounded corner 46 joins the walls 42 and 44 together. Small sidewalls 47 which extend in generally parallel relationship with one another extend generally perpendicularly between and join opposite sides of the walls 42-43.

Each corner member 24 also includes a pair of cantilevered securing legs or plates 51 and 52 which are fixedly joined to the blocklike part 41 and project in generally perpendicular relationship to one another. Each of these cantilevered securing legs includes an enlarged and generally flat outer or top wall 53, and terminates in a generally free edge 55. Each securing plate 51 defines a pair of sidewalls or edges 54 as the respective securing leg projects cantilevered from the block part 41 to its respective free edge 55, which side edges 54 are slightly angled so as to gradually converge or taper toward one another as they project toward the respective free edge 55.

The securing leg 51 is cantilevered from the enlarged inner wall 43 of the blocklike part 41 and projects generally perpendicularly away therefrom, and the top wall 53 of the securing leg 51 is disposed generally parallel with but spaced downwardly a small distance from the small edge wall 44, whereby the inner wall 43 defines a small shoulder 56 therebetween.

As to the other securing leg 52, this leg projects perpendicularly outwardly away from the inner edge wall 45 whereby the bottom surface 57 of this leg 52 is substantially coplanar with the enlarged inner wall 43 of the blocklike part 41. This leg 52, however, has a thickness less than that of the blocklike part 41, whereby the upper surface 53 of leg 52 is offset downwardly whereby the edge wall 45 defines a shoulder therebetween substantially as illustrated by FIG. 6.

Figure 7:
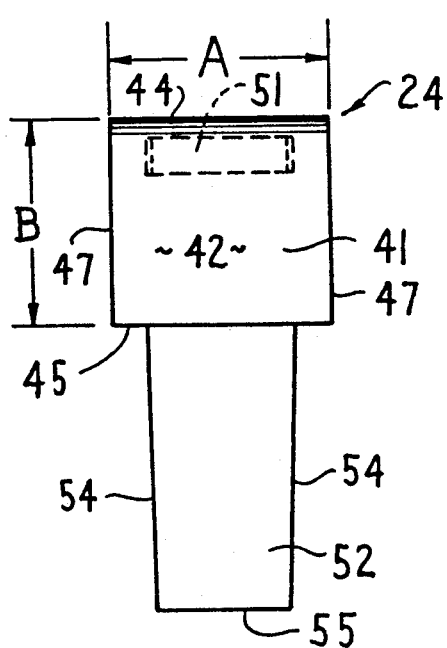
FIG. 7 is an elevational view of the corner member illustrated in FIG. 6.
Figure 6:
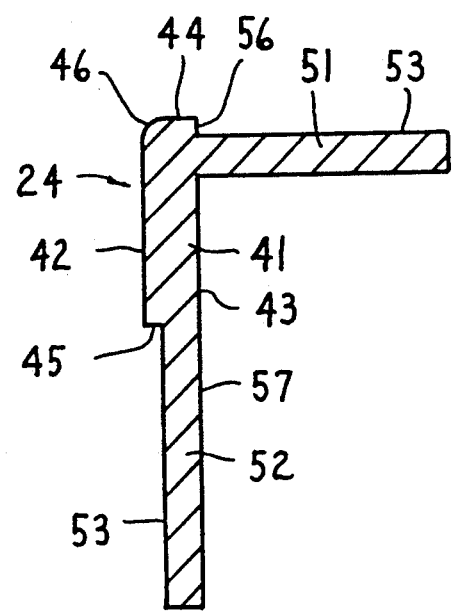
FIG. 6 is a sectional view of the corner member associated with the side panel of FIG. 4.

As illustrated by FIGS. 6 and 7, the blocklike part 41 has a width A which substantially equals the width of the rail 22, 23 as measured across the outer wall 26 including the projecting edge parts 32. The legs 51 and 52, as illustrated by FIG. 7, are of less width than the blocklike part 41 and in fact the side edges 54 of the legs are spaced inwardly from the respectively adjacent side edges 47 by a small distance so that the maximum width of the legs 51 and 52 substantially equals the maximum width of the guide channel 31 defined within the rails. Each leg 51 and 52 preferably has a thickness which substantially equals and normally is slightly less than the thickness of the guide groove 31 so that the legs 51 and 52 can be inserted into the guide grooves 31. The blocklike part 41 also has a length B which substantially corresponds to the thickness or height of the rails 22 and 23 as measured perpendicularly between outer and inner walls 26 and 27 thereof.

As illustrated by FIG. 4, the corner member 24 is disposed to cooperate between adjacent ends of rails 22 and 23, with the blocklike part 41 being positioned to close off the open end of the side rail 23 whereby the transversely projecting securing leg 51 is inserted into the guide groove 31 of the rail 23, and at the same time the projecting cantilevered leg 52 is inserted into the guide groove 31 of the rail 22. These securing legs 51 and 52 are preferably snugly accommodated within the guide grooves 31 of the respective rails due to the tapered configuration thereof, whereby full insertion of the securing legs into the respective guide grooves results in each securing leg effecting a snug fit within the end of the respective rail.

In addition, the dimensional configuration A and B of guide block 41 results in this blocklike part 41 having a width which extends across the entire width of the side panel corresponding to that defined by the outer wall 26 of the rails. The frame 21 is initially assembled together by means of the corner members 24, and the core sheet 35 secured into position within the frame opening. Thereafter the side sheets 36 are adhesively secured to opposite sides of the frame and the core sheet so as to define a strong and rigid, yet light weight panel. The corners of the sheets 36 are notched out prior to securement to the frame so as to accommodate the blocklike corner part 41 in the notched out recesses.

Figure 3:
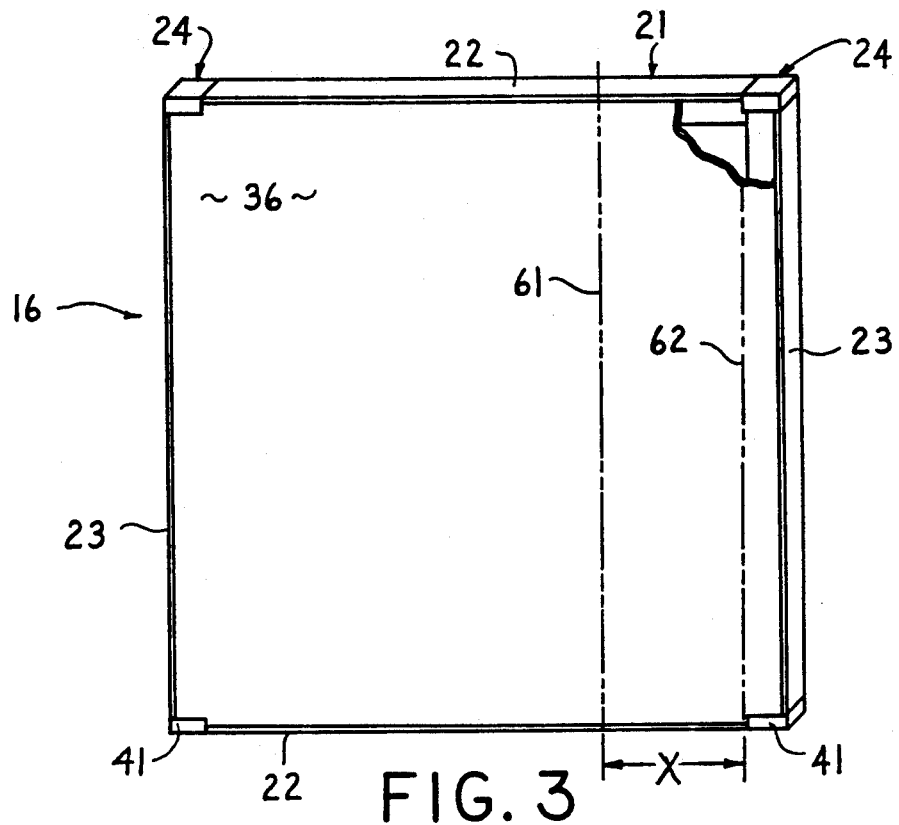
FIG. 3 is a perspective view of an improved side panel according to one embodiment of the present invention.

When the side panel 16 is assembled as illustrated by FIG. 3, such panel can be easily accommodated within conventional posts 15, such as by being vertically slidably inserted into the opposed slots 17 and 18 of an adjacent pair of posts as illustrated by FIG. 2, with the lower edge of the side panel 16 being generally seated against the upper surface of the bed.

In situations where the adjacent posts 15 are spaced closer together so as to require a narrower side panel, then the panel 16 of the present invention can be readily cut down to the desired width without requiring complex equipment. For example, if it is desired to reduce the width of the side panel by a dimension "X" which dimension is represented between the two dotted lines 61 and 62 in FIG. 3, then the panel 16 is cut along two lines, namely the two lines 61 and 62. The one cut line 62 is always defined vertically along the panel parallel to the side edge rail 23, with the line 62 being disposed so as to extend between the inner edges 45 of the opposed upper and lower corner blocks 41. The other cut line 61 is then defined parallel with the line 62 at a distance "X" therefrom corresponding to the amount by which the panel width is to be reduced. The panel is first cut along the line 61 so as to separate the panel into right and left parts. Cutting along the line 61 will normally require only a utility knife and a hacksaw. A utility knife can be utilized to cut the side sheets 36 and the underlying core sheet 35 along the line 61, and thereafter the upper and lower edge rails 22 are cut along the line 62 using the hacksaw, thereby totally separating the panel into right and left parts. Thereafter the right part is cut along the line 62 utilizing the utility knife to cut just the side sheets 36, which cut line 62 extends directly along the inner surface of the inner wall 27 of the side rail 23. Thereafter the side sheets in the region between cut lines 61 and 62 are removed, thereby exposing the underlying core sheet in the same region, which core sheet is also removed, again using the utility knife to cut it away from the side rails if necessary. The short cut segments of the upper and lower rails 22 which are secured to the corner members 24 associated with the right part can then be manually removed and disposed of, thereby leaving just the right-side side rail 23 having corner members 24 secured to opposite ends thereof, and small strips of the side coverings 36 as secured to opposite sides of the side rail. This side rail is then reinserted or reattached to the left part of the panel by inserting the exposed projecting legs 52 into the cut ends of the upper and lower rails until the side rail 23 substantially abuts the cut ends of the top and bottom rails, whereupon the previous cut lines 61 and 62 as defined along the edges of the side coverings 36 now substantially abut one another. Prior to this assembly, however, a suitable adhesive can be provided along the surface of inner wall 27 of the side rail so as to abut the cut edge of the core sheet and create an adhesively securement when the two parts are reassembled.

With the cut-down panel reassembled, then the panel can again be vertically slidably inserted into the opposed grooves 17-18 of a pair of adjacent posts so as to function in the desired manner. When so reassembled after being reduced in width, the panel 16 still possesses desirable strength since the depth of the channels 17 and 18 normally significantly exceeds the depth of the side rails 23 as measured between the walls 26 and 27 thereof, and hence the edge of the panel part which is cut and reassembled is thus totally confined within the post slot 17 or 18. Thus the reassembled side panel 16 possesses significant strength so as to resist the load which is imposed thereon during use.

Reference is now made to FIGS. 8-11 which illustrate an improved side panel constructed according to a second embodiment of the present invention. In this latter embodiment, parts thereof which correspond to parts of the embodiment of FIGS. 4-8 are designated by the same reference numerals but with the addition of "100" thereto.

The improved side panel 116 of FIGS. 8-11 again includes a rigid rectangular ringlike frame 121 which resembles a picture frame and is defined by generally parallel top and bottom frame elements or rails 122 rigidly joined together by generally parallel side frame elements or rails 123. The free ends of the rails 122 and 123 are each provided with mitered end surfaces which angle at 45° relative to the longitudinal direction of the respective rail, whereby the adjacent angled ends of the horizontal and vertical rails abut as indicated at 76 in FIG. 8 so as to define the corners of the frame. Each corner of the frame has a corner member 81 associated therewith, as described below, for fixedly securing the abutting ends of rails 122 and 123 together in perpendicular or right angle relationship to one another.

The rails 122 and 123 are preferably each constructed as an integral one-piece metal element, such as by being extruded of aluminum, and have a generally U- or channel-shaped cross section as illustrated by FIG. 9. This channel-shaped cross section of each rail 122 or 123 includes a pair of generally parallel sidewalls 72 which extend perpendicularly with respect to an outer or base wall 71 so as to define a channel which opens inwardly toward the interior of the frame. The rail also has projections of flanges 73 which project inwardly toward one another from the opposed sidewalls 72, which flanges 73 are spaced a selected distance from and extend generally parallel with the base wall 71 so as to define an interior guide groove or channel 74 therebetween which is of generally rectangular cross section. The side walls 72 project in cantilevered fashion outwardly beyond the flanges 73 through a significant distance, with these sidewalls 72 defining a further channel or chamber 75 therebetween which opens outwardly from the flanges 73 through the mouth or opening defined between the free ends of the sidewalls 72.

Considering now the corner member 81, one of which is associated with each corner of the frame, this member is generally L-shaped and defines a pair of substantially identical platelike legs 82 which extend in perpendicular relationship to one another. One of the legs 82 projects into the guide channel 74 associated with the adjacent end of one of the rails 122-123 defining the corner, and the other leg 82 similarly projects into the guide channel 74 defined in the end of the other rail 122-123 defining the corner. These legs 82 are of a rectangular cross section so as to substantially correspond to the cross sections of the guide channels 74, whereby the legs are snugly accommodated and substantially totally fill these channels. The legs 82 preferably have a horizontal cross section, as illustrated by FIG. 11, which is several times greater than the vertical cross section.

To fixedly and rigidly join the frame rails 122 and 123 together, each leg 82 of each corner member 81 is fixedly secured to the respective rail 122-123 with which it is engaged. In the illustrated embodiment this is accomplished by creating a pair of generally aligned and opposed deformations or projections 83 in the opposite side walls 72, which deformations 83 project inwardly into the chamber 74 so as to engage and create a fixed or locking engagement with opposite side faces of the respective corner leg 82 to fixedly secure the corner leg to the respective frame rail. The deformations 83 are preferably formed by a wedge-shaped punch which is engaged with the sidewall 72, after the corner member has been assembled to the frame rails, and is then pushed inwardly to deform a small portion of the sidewall material inwardly so as to define the projections 83 which lockingly engage the corner leg 82.

The open interior 134 of the frame 121 is closed by a panel-like member which includes a sheetlike or platelike core member 135 which is of substantial thickness and in particular has a thickness which occupies a majority of the width of the channel 75 as defined between the opposed sidewalls 72. This core member 135 is preferably constructed of a rigid foamed plastic, such as a polystyrene foam having a thickness in the range of from about ⅜ to ½ inch. The core sheet 135 also has the opposite side faces thereof provided with thin sheetlike side coverings 136 which extend coextensively over the entire side faces of the core sheet 135. These side coverings 136 preferably comprise thin sheetlike members, such as thin rigid plastic sheets or panels, which panels 136 are adhesively and fixedly secured to opposite sides of the core sheet 135 to define a three-layer laminate. These side sheets 136 in a preferred embodiment are constructed of an "ABS" plastic and preferably have a thickness in the range of about 0.020 to about 0.035 inch.

The panel member defined by the laminate core structure 135-136 has an overall thickness so as to be snugly accommodated within the channels 75 defined by the assembled frame rails 122-123, with the laminated panel member being slightly smaller than the rectangular profile defined by the interior flanges 73 to provide a small clearance 79 between the flanges 73 and one or more edges of the laminate panel member to provide for thermal expansion and contraction between the laminate panel member and the frame without causing bowing of the laminate panel member.

The assembled side panel 116 can be easily accommodated within conventional posts 15 (FIG. 2) in the same manner as described above relative to the first embodiment.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a bed structure for a truck or trailer having a load-supporting bed which defines thereon a horizontally upwardly facing loading surface, said bed having peripheral edges, and a sidewall structure mounted on and projecting upwardly from said bed structure adjacent at least one of the peripheral edges of the bed, said sidewall structure including a plurality of upright support posts which are mounted on and project upwardly from said bed in generally cantilevered relation, said posts having vertically elongate panel-receiving grooves formed therein, and a plurality of removable and vertically-oriented side panels cooperating with said posts for defining an upright wall which projects upwardly relative to said loading surface, said panel extending horizontally between a pair of adjacent said posts and having vertically-extending end edges which are accommodated within the grooves of said posts for horizontally securing said panel relative to said pair of posts, the improvement wherein said panel comprises:

a generally rectangular ringlike frame defined by generally parallel top and bottom edge rails which are horizontally elongate and are rigidly joined together by a pair of generally parallel side edge rails which are vertically elongate and extend substantially perpendicularly between said top and bottom rails, each of said side edge rails having upper and lower ends which are disposed adjacent ends of the top and bottom rails respectively and are respectively disposed at upper and lower corners of the side panel, the frame having an interior defined by said edge rails;

said frame including a set of four rigid corner members, one said corner member being located adjacent each corner of said side panel and being joined to adjacent ends of two said edge rails which effectively meet at said corner;

each said corner member being of a generally L-shaped configuration and including a blocklike corner part which abuts and substantially closes off the end of one of the two said edge rails which meet at said corner, said blocklike part having generally parallel and enlarged outer and inner walls with said inner wall being positioned substantially in abutting engagement with said end;

said corner member having a first securing leg fixed thereto and projecting generally perpendicularly outwardly in cantilevered relationship away from said inner wall, said first securing leg projecting longitudinally into said one edge rail from the end thereof for snug engagement therewith to fixedly secure said one edge rail to said corner member;

said corner member having a second securing leg projecting outwardly in cantilevered relation from said blocklike part in generally perpendicular relationship to said first securing leg, said second securing leg projecting longitudinally into said other edge rail from the end thereof at said corner for creating a snug and fixed engagement with said other rail, and the enlarged outer wall on said corner member being substantially flush and coextensive with an outer wall defined on said other rail;

a core structure disposed within and substantially filling the interior of said frame; and a pair of cover members one fixedly secured to each side of said frame and extending coextensively across the interior of said frame for enclosing the core structure between the pair of cover members, said cover members defining exterior side surfaces of the side panel.

2. A structure according to claim 1, wherein each said rail is defined by a generally hollow tube of substantially rectangular cross section, said tube having generally parallel outer and inner walls joined together by generally parallel sidewalls extending therebetween, said outer wall having edge parts which extend longitudinally therealong and which project transversely outwardly a small extent beyond the respectively adjacent sidewalls for defining a shoulder, and said cover members being disposed so as to extend over and be adhesively secured to exterior surfaces of the rails, and said cover members having free edges which substantially abut the shoulders defined by the projecting edge parts of the outer walls.

3. A structure according to claim 2, wherein the core structure comprises a generally rigid member which substantially totally occupies the interior of said frame, and wherein said cover members comprise thin rigid sheets of plastic material which are adhesively secured to side surfaces of said rigid member and sidewalls of said rails.

4. A structure according to claim 3, wherein said rigid member is made of a rigid foamed plastics material, and wherein said rails are made of aluminum.

5. A structure according to claim 4, wherein each said rail has an internal flange structure which projects transversely inwardly from one of said rail sidewalls and is spaced from the rail outer wall to define therebetween a longitudinally elongate guide groove for snugly accommodating therein a respective securing leg of the corner member.

6. A structure according to claim 1, wherein each said rail comprises a generally hollow elongate tube of generally rectangular cross section defined by generally parallel outer and inner walls which are rigidly joined together by generally parallel sidewalls which extend transversely between the outer and inner walls, the horizontal and vertical rails defining each said corner being oriented so that the end of the horizontal rail abuts the inner wall of the vertical rail with said vertical rail projecting vertically a sufficient extent so as to vertically overlap at least a significant part of the end of said horizontal rail, said vertical rail terminating in the end which is located vertically between the outer and inner walls of said horizontal rail, and the blocklike part of a respective corner member abutting and closing off the end of said vertical rail and projecting vertically so that an outer surface of said blocklike part is substantially horizontally coextensive with an outer surface of the outer wall of said horizontal rail.

7. A structure according to claim 6, wherein the outer wall of each said rail includes edge parts which extend longitudinally therealong and project outwardly a small distance beyond the respectively adjacent sidewalls for defining shoulders which substantially abut and confine edges of the cover members.

8. A vertically-oriented side panel for cooperation with upright posts which are mounted on and project upwardly from a truck or trailer bed for defining an upright wall which projects upwardly relative to the bed, said side panel comprising:

a generally rectangular ringlike rigid frame defined by generally parallel top and bottom edge rails which are horizontally elongate and are rigidly joined together by a pair of generally parallel side edge rails which are vertically elongate and extend substantially perpendicularly between said top and bottom rails, each of said side edge rails having upper and lower ends which are disposed adjacent ends of the top and bottom rails respectively and are respectively disposed at upper and lower corners of the side panel, the frame having an interior defined by said edge rails;

said frame including a set of four rigid corner members, one said corner member being located adjacent each corner of said side panel and being joined to adjacent ends of two said edge rails which effectively meet at said corner;

each said corner member being of a generally L-shaped configuration and including a blocklike corner part which abuts and substantially closes off the end of one of the two said edge rails which meet at said corner, said blocklike part having generally parallel and enlarged outer and inner walls with said inner wall being positioned substantially in abutting engagement with said end;

said corner member having a first cantilevered securing leg projecting longitudinally into said one edge rail from the end thereof for snug engagement therewith to fixedly secure said one edge rail to said corner member;

said corner member having a second cantilevered securing leg projecting longitudinally into the other rail from the end for creating a snug and fixed engagement with said other rail;

a core structure disposed within and substantially filling the interior of said frame; and a pair of cover members one fixedly secured to each side of said frame and extending coextensively across the interior of said frame for enclosing the core structure between the pair of cover members, said cover members defining exterior side surfaces of the side panel.

9. A side panel according to claim 8, wherein the core structure comprises a generally rigid member which substantially totally occupies the interior of said frame, and wherein said cover members comprise thin rigid sheets which are adhesively secured to side surfaces of said rigid member and sidewalls of said rails.

10. A side panel according to claim 9, wherein said rigid member is made of a rigid foamed plastics material, and wherein said cover members are made of a nonmetal material.

11. A side panel according to claim 8, wherein an outer wall of each said rail includes edge flanges which extend longitudinally therealong and project outwardly a small distance for defining shoulders which substantially abut and confine edges of the cover members.

12. A side panel according to claim 8, wherein each said rail is defined by a generally hollow tube of substantially rectangular cross section, said tube having generally parallel outer and inner walls joined together by generally parallel sidewalls extending therebetween, said outer wall having edge parts which extend longitudinally therealong and which project transversely outwardly a small extent beyond the respectively adjacent sidewalls for defining a shoulder, and said cover members being disposed so as to extend over and be adhesively secured to exterior surfaces of the rails, and said cover members having free edges which substantially abut the shoulders defined by the projecting edge parts of the outer walls.

13. A side panel according to claim 12, wherein each said rail has an internal flange structure which projects transversely inwardly from one of said rail sidewalls and is spaced from the rail outer wall to define therebetween a longitudinally elongate guide groove for snugly accommodating therein a respective securing leg of the corner member.

14. A side panel according to claim 8, wherein each said rail comprises a generally hollow elongate tube of generally rectangular cross section defined by generally parallel outer and inner walls which are rigidly joined together by generally parallel sidewalls which extend transversely between the outer and inner walls, the horizontal and vertical rails defining each said corner being oriented so that the end of the horizontal rail abuts the inner wall of the vertical rail with said vertical rail projecting vertically a sufficient extent so as to vertically overlap at least a significant part of the end of said horizontal rail, said vertical rail terminating in the end which is located vertically between the outer and inner walls of said horizontal rail, and the blocklike part of a respective corner member abutting and closing off the end of said vertical rail and projecting vertically so that an outer surface of said blocklike part is substantially horizontally coextensive with an outer surface of the outer wall of said horizontal rail.

15. A side panel according to claim 14, wherein the outer wall of each said rail includes edge parts which extend longitudinally therealong and project outwardly a small distance beyond the respectively adjacent sidewalls for defining shoulders which substantially abut and confine edges of the cover members.

16. In a bed structure for a truck or trailer having a load-supporting bed which defines thereon a horizontally upwardly facing loading surface, said bed having peripheral edges, and a sidewall structure mounted on and projecting upwardly from said bed structure adjacent at least one of the peripheral edges of the bed, said sidewall structure including a plurality of upright support posts which are mounted on and project upwardly from said bed in generally cantilevered relation, said posts having vertically elongate panel-receiving grooves formed therein, and a plurality of removable and vertically-oriented side panels cooperating with said posts for defining a upright wall which projects upwardly relative to said loading surface, said panel extending horizontally between a pair of adjacent said posts and having vertically-extending end edges which are accommodated within the grooves of said posts for horizontally securing said panel relative to said pair of posts, the improvement wherein said panel comprises:

a generally rectangular ringlike frame defined by generally parallel top and bottom edge rails which are horizontally elongate and are rigidly joined together by a pair of generally parallel side edge rails which are vertically elongate and extend substantially perpendicularly between said top and bottom rails, each of said side edge rails having upper and lower ends which are disposed adjacent ends of the top and bottom rails respectively and are respectively disposed at upper and lower corners of the side panel, the frame having an interior defined by said edge rails;

said frame including a set of four rigid corner members, one said corner member being located adjacent each corner of said frame and being joined to adjacent ends of two said edge rails which effectively meet at said corner;

each said corner member being of a generally L-shaped configuration and including first and second securing legs which are fixed to one another and project generally perpendicularly outwardly in cantilevered relationship away from one another;

each of said edge rails being defined by generally parallel sidewalls which are sidewardly spaced apart and rigidly joined together by an outer wall which extends therebetween and defines an outer peripheral edge of said frame, each of said edge rails also including an internal flange structure which is fixedly secured to and projects generally perpendicularly inwardly from at least one of said sidewalls, said flange structure extending longitudinally of the rail in spaced but generally parallel relationship with said outer wall to define a longitudinally elongate guide groove therebetween;

each said securing leg of said corner member projecting longitudinally into the elongate guide groove of one of the edge rails defining the corner and being snugly accommodated within the respective guide groove;

a panel-like laminate member stationarily supported on said frame and extending across the interior thereto for closing off said interior, said laminate member including a platelike core member constructed of a rigid foamed plastics material having a thickness which constitutes a majority of the sideward spacing between the opposed sidewalls of said rails; and said laminate member also including relatively thin sheetlike facing sheets fixedly secured to and coextensively covering opposite side faces of said core member, each of said facing sheets being constructed of a hard plastic material and having a thickness which is a small fraction of the thickness of said core member.

17. A structure according to claim 16, wherein said rails are each of an open U-shaped cross section defining a longitudinally elongate channel-like mounting chamber which is defined between the sidewalls and extends from said internal flange structure inwardly into the interior of the frame, and said laminate member having a peripheral edge portion thereof projecting into the mounting channels of said edge rails with free edges of said laminate member being spaced a small distance from the internal flange structure of at least some of said edge rails to accommodate relative thermal expansion and contraction between the laminate member and the frame.

18. A structure according to claim 17, including means cooperating between each securing leg and the respective edge rail for fixedly joining the edge rail to the respective securing leg, said securing means including a deformation associated with each sidewall of the edge rail for creating a locking securement with an opposed side face of the respective securing leg.

19. A structure according to claim 16, wherein said sheetlike core member is of a rigid plastic foam and has a thickness in the range of about ⅜ to ½ inch, and wherein said facing sheets are of a hard plastic material and have a thickness in the range of about 0.020 to about 0.035 inch.

20. A structure according to claim 16, wherein the facing sheets have edge portions which overlap exterior surfaces of the sidewalls of the frame rails and are adhesively secured thereto.

21. A structure according to claim 16, wherein edge portions of the laminate member including the core member and the facing sheets project into and are snugly confined within a channel-like space defined between the sidewalls of the edge rails.

* * * * *